3,328,318
EPOXIDE COMPOSITIONS
William R. Proops, Charleston, Charles W. McGary, Jr., South Charleston, and Donald R. Montgomery, Charleston, W. Va., assignors to Union Carbide Corporation, a corporation of New York
No Drawing. Filed Aug. 30, 1961, Ser. No. 134,850
19 Claims. (Cl. 260—2)

This invention relates to epoxide compositions. In one aspect, this invention is directed to the curing of epoxides with uranium catalysts.

A variety of catalysts have been suggested for use in promoting the cure or polymerization of epoxide compositions into hardened, infusible and insoluble products of relatively high molecular weight, the cured epoxy compound being either in the form of a homopolymer or copolymer with various organic compounds capable of interaction with the active groups of the epoxide. Included among the known catalysts are strongly acidic materials such as sulfuric acid, phosphoric acid, etc.; aromatic sulfonic acids such as toluenesulfonic acid and benzenesulfonic acid; Lewis acids, e.g., boron trifluoride, stannic chloride, etc.; and boron trifluoride-amine complexes such as boron trifluoride-monoethylamine, boron trifluoride-piperidine, and the like. Although these catalysts are effective for the curing or polymerization process, their use has been handicapped to some extent due to a number of reasons. For example, the use of Lewis acid catalysts such as boron trifluoride suffer the disadvantage of effecting rapid and uncontrolled exotherms during the cure of epoxides to resins, frequently causing thermal decomposition in the composition as evidence by charring, or expulsion of components as indicated by bubble formation and foaming. A number of these catalysts are of a corrosive nature and cause uncontrollable gel rates in the cure of certain epoxide formulations which thus seriously limits their industrial application in the field of coatings, adhesives, and potting compositions.

The present invention is based on the discovery that certain uranium compounds are especially effective catalysts for promoting the cure of the monoepoxides and polyepoxides hereinafter described. It has been found that the incorporation of small amounts of a uranium catalyst in the polyepoxides provides curable compositions which have a desirable working life and can be cured at room temperature without incurring rapid gelation or uncontrollable exotherms. The curable compositions can be spread, brushed or sprayed by techniques known in the paint, varnish and lacquer industries, and can be advantageously used in the encapsulation of electrical components and other applications such as adhesives, laminates, castings and foams. Mixtures of uranium catalysts with epoxides offer the further advantage in that they can be modified with active organic hardeners such as polycarboxylic acids and anhydrides and polyols, to provide epoxy resins having a wide range of varying and preselected properties.

Uranium compounds which have been found suitable for use as catalysts in the instant invention include the several classes of uranium derivatives as hereinafter described. Each of the compounds evaluated exhibited moderate to extremely high catalytic activity when utilized for the homopolymerization of monoepoxides and polyepoxides as well as for copolymerization with various hardeners. Particularly noteworthy, is the ability of the uranium compounds to catalyze polyepoxide systems which were heretofore characterized by little, or extremely low reactivity. Thus, for example, due to their low reactivity, completely satisfactory resins have not previously been obtainable from systems containing dicyclopentadiene dioxide and methyl Nadic anhydride when known catalysts were used. Moreover, the uranium catalysts were found to be very active in copolymerizing epoxides and polyols, a reaction which usually necessitates a strongly acidic catalyst such as boron trifluoride. Heretofore, the use of a strongly acidic catalyst in such a system resulted in resins having poor thermal stability, undoubtedly due to the side reactions caused by catalyst.

A further unique feature of the catalysts of this invention is their excellent resistance toward inactivation by moisture. Uranium compounds which had been exposed to atmospheric conditions for periods of several weeks lost very little, if any, of their catalytic activity. This characteristic is particularly desirable in coatings where thin films are cured in air.

The uranium catalysts which have been found suitable for curing epoxides can be broadly classified as follows:

(A) Uranium and uranyl derivatives of organic and inorganic compounds.
(B) The uranates and polyuranates.
(C) Uranium oxides.

Suitable catalysts encompassed by class (A) above, include the uranium compounds of the formulae:

(I)      $UX_{4/z}Yn$
(II)     $UOX_{2/z}Yn$
(III)    $UO_2X_{2/z}Yn$ wherein X represents an acylate, alkoxy, aryloxy, alkylthio, and arylthio groups, or an inorganic acid anion such as nitrate, sulfate, phosphate, chlorate, chloride, fluoride, or an anion from a charged chelating group; z represents the valence associated with X; Y represents an uncharged complexing ligand such as water, alcohol, ether, amine, or carboxyl compound; and n has a value of from 0 to 9.

Preferred catalysts within the aforementioned group include the uranium compounds represented by Formula I wherein X represents an acylate group of from 1 to 22 carbon atoms; z has a value of 1; and n is zero. Particularly preferred compounds are the uranium tetraalkanoates which contain from 1 to 18 carbon atoms in each acylate group. Illustrative compounds include, among others, uranium tetraacetate, uranium tetrapropionate, uranium tetrabutyrate, uranium tetrapentanoate, uranium tetraoctoate, and the like.

Also included within this group are the uranium catalysts represented by group (I) wherein X is a halide; z has a value of 1 and n is zero. Suitable catalysts include uranium tetrabromide, uranium tetrachloride, uranium tetrafluoride, and the like.

Particularly preferred uranium catalysts which are suitable for use in the instant invention are those compounds represented by Formula III. Included within this group are the uranyl acylates, uranyl halides and uranyl salts of inorganic acids and various complexes thereof. The uranyl acylate catalysts are preferably those containing from 1 to 22 carbon atoms, and still more preferably from 1 to 18 carbon atoms in each acylate group. The acylate group can be either aliphatic, or aromatic or a combination of the two. Typical uranyl acylates include, among others, uranyl formate, uranyl acetate, uranyl propionate, uranyl butyrate, uranyl caproate, uranyl 2-ethylhexanoate, uranyl laurate, uranyl stearate, uranyl abietate, uranyl (o-benzoylbenzoate), uranyl (p-toluyl-o-benzoate), and the like. Also suitable are the uranyl halides such as uranyl chloride, uranyl bromide, the uranyl salts of inorganic acids include those represented by the above Formula III wherein z is 1 or 2; Y represents water and n has a value of 3, 4 or 6. Illustrative catalysts include, uranyl sulfate: $UO_2SO_4 \cdot 3H_2O$, uranyl phosphate: $UO_2(HPO_4) \cdot 4H_2O$, uranyl nitrate: $UO_2(NO_3)_2 \cdot 6H_2O$, and the like. Also suitable for use in the curable compositions of the instant invention are the double salts of the aforementioned inorganic acids such as potassium uranyl nitrate: K₂[UO₂(NO₃)₄], lithium uranyl sulfate: Li₂[UO₂(SO₄)₂]·4H₂O, and the like. In addition to the double salts of uranium compounds, various organic complexes have also been found useful in the polymerization of the epoxides. For instance, uranyl ethylenediamine bisacetylacetonate, uranyl bisbenzoylacetonate pyridine, uranyl bisacetylacetonate pyridine, uranyl bisacetylacetonate quinoline, and the like.

The uranates and polyuranates of the aforesaid class (B) are also suitable as catalysts in the instant invention. This class includes uranium compounds of the formula:

(IV)   $M_{2/z}UO_4$ (V)    $M_{2/z}U_2O_7$ wherein M represents a metallic or ammonium cation, or an organic hydrocarbon group, and z is the valence exhibited by M. Typical catalysts include, among others, sodium uranate, potassium uranate, ammonium uranate, sodium biuranate, potassium biuranate, ammonium biuranate, pyridine trisalicylate uranate, and the like.

Also suitable as catalysts are the uranium compounds of class (C) above. This class comprises the uranium oxides either in their hydrated or anhydrous form. Illustrative uranium oxides include uranium dioxide: UO₂, uranium oxide: U₃O₈, uranium trioxide: UO₃, uranium peroxide: UO₄·2H₂O, and the like.

In carrying out the invention the uranium catalysts are mixed with epoxides to obtain a homogeneous curable composition. With epoxides that are liquid and viscous, the catalyst can be simply admixed with the epoxide by conventional means as, for example, by stirrers and the like. When the catalyst and epoxide are immiscible at room temperatures, or if the epoxide is normally solid, the epoxide can be melted or mixed with a liquid organic solvent. Typical solvents include organic ethers such as diethyl ether, methyl propyl ether; organic esters, such as methyl acetate, ethyl propionate; and organic ketones such as acetone and cyclohexanone, and the like. In general, the physical form of the uranium catalyst is not necessarily critical. However, the catalyst should be at least partially soluble in the curable mixture or in a suitable solvent such as alcohols, ketones, ethers, esters, and the like.

Due to their relatively high activity, extremely small quantities of the uranium catalyst can be employed. Resins with excellent physical properties and reasonable cure rates have been produced using as little as 0.005 weight percent. However, the amount of catalyst employed will, of necessity, vary with the cure rate desired and the curing temperature employed. Thus, by the term "catalytic amount" as employed in the specification and appended claims, is meant an amount sufficient to cure the epoxide compositions. As a general guide, good results are obtained by utilizing the uranium catalyst in amounts ranging between 0.001 and 5 percent, preferably 0.005 to 1.0 percent, and still more preferably 0.01 to 0.2 percent by weight, based on the total weight of the curable epoxide composition.

The mixture of epoxide composition and catalyst can be cured over a wide temperature range. For example, the catalyst can be added to the epoxide composition at room temperatures, i.e., about 15 to 25° C., and the cure effected, or if a rapid cure is desired the mixture can be heated to temperatures as high as 250° C. or more. Higher temperatures above 250° C. are generally undesirable due to the discoloration which may be induced. Other single curing temperatures and combinations of curing temperatures can be employed as desired.

The uranium catalysts described above are used to promote the cure of a wide variety of known monoepoxide and polyepoxide compositions, the cured composition produced being in the form of a homopolymer, or copolymer with an active organic hardener. The curable epoxide compositions can be monomeric or polymeric, saturated or unsaturated, aliphatic, aromatic or heterocyclic, and can be substituted, if desired, with substitutents such as hydroxy, halide, alkyl, aryl, carboxyl, and the like. Thus, for example, the instant invention contemplates the preparation of homopolymers and copolymers of monoepoxides and polyepoxides containing cyclohexene oxide, cyclopentene oxide, bicycloheptene oxide, and cyclooctene oxide groups. Also included are the epoxidized alkenes, the glycidyl ethers of polyhydric phenols and alcohols, epoxidized polybutadiene, epoxidized copolymers of butadiene, epoxidized natural oils, and the like.

In one embodiment of the instant invention the monomeric polyepoxides which can be cured with the uranium catalysts contain at least two oxirane oxygen atoms, at least one of which is bonded to two vicinal cycloaliphatic carbon atoms. The other oxygen atom is also bonded to two vicinal carbon atoms, but the carbon atoms need not necessarily form part of a cycloaliphatic ring. Thus, the polyepoxide component contains at least two vicinal epoxy groups, i.e.,

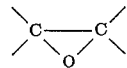

the epoxy carbon atoms of at least one of the groups forming a portion of a cycloaliphatic hydrocarbon nucleus. The cycloaliphatic nucleus preferably contains from 4 to 8 carbon atoms including the epoxy carbon atoms, and preferably from 5 to 7 carbon atoms.

Diepoxides which contain both oxirane oxygen atoms bonded to cycloaliphatic carbon atoms are highly preferred. Polyepoxides which contain solely carbon, hydrogen, and oxygen atoms are especially preferred. The oxygen atoms can be (in addition to oxirane oxygen) etheric oxygen, i.e., —O—; oxygen present in an ester group, i.e.,

oxygen present in a carbonyl group, i.e.,

and the like. A single polyepoxide or a mixture of at least two polyepoxides can be employed in the novel curable compositions.

Illustrative polyepoxides include, for example, the alkanediol bis(3,4-epoxycyclohexanecarboxylates), the alkenediol bis(3,4-epoxycyclohexanecarboxylates), the alkanediol bis(lower alkyl substituted-3,4-epoxycyclohexanecarboxylates), the oxaalkanediol bis(lower alkyl substituted-3,4-epoxycyclohexanecarboxylates), the alkanetriol tris(3,4-epoxycyclohexanecarboxylates), the alkenetriol tris(3,4-epoxycyclohexanecarboxylates), the alkanetriol tris(lower alkyl substituted-3,4-epoxycyclohexanecarboxylates), the oxaalkanetriol tris(3,4-epoxycyclohexanecarboxylates), the oxaalkanetriol tris(lower alkyl substituted-3,4-epoxycyclohexanecarboxylates), and the like. The above-illustrated polyol poly(3,4-epoxycyclohexanecarboxylates) can be prepared by epoxidizing the corresponding polyol poly(cyclohexenecarboxylate) with at least a stoichiometric quantity of peracetic acid (preferably contained as solution in ethyl acetate) per carbon to carbon double bond of said polyol poly(cyclohexenecarboxylate), at a temperature in the range of from about 25° to 90° C., for a period of time sufficient to introduce oxirane oxygen at the sites of all the carbon to carbon double bonds contained in the polyol poly(cyclohexenecarboxylate) reagent. The polyol poly(cyclohexenecarboxylates), in turn, can be prepared in accordance with well known condensation techniques, e.g., the esterification of a polyol, e.g., ethylene glycol, diethylene glycol, triethylene glycol, tetraethylene glycol, 1,2-propylene glycol 1,3-propylene glycol, the polyoxyethylene glycols, 1,4-butanediol, 1,5-pentanediol, 1,6-hexanediol, the octanediols, the octadecanediols, the butenediols, the pentenediols, the hexenediols, the octenediols, 1,2,3-propanetriol, trimethylolmethane, 1,1,1-trimethylolethane, 1,1,1-trimethylolpropane, 1,2,6-hexanetriol, cycloaliphatic triols, aromatic triols, and the like; with a 3-cyclohexenecarboxylic acid, e.g., 3-cyclohexenecarboxylic acid, lower alkyl substituted-3-cyclohexencarboxylic acid, and the like. The expression "lower alkyl," as used in the disclosure, means an alkyl radical which contains from 1 to 4 carbon atoms.

Other polyepoxides contemplated include, for instance, the bis(3,4-epoxycyclohexylmethyl) hydrocarbon dicarboxylates and the bis(lower alkyl substituted-3,4-epoxycyclohexylmethyl) hydrocarbon dicarboxylates, e.g., bis(3,4-epoxycyclohexylmethyl) oxalate, bis(3,4-epoxycyclohexylmethyl) malonate, bis(3,4-epoxycyclohexylmethyl) succinate, bis(3,4-epoxycyclohexylmethyl) glutarate, bis(3,4-epoxycyclohexylmethyl) adipate, bis(3,4-epoxycyclohexylmethyl) maleate, bis(3,4-epoxycyclohexylmethyl) tetrahydrophthalate, bis(3,4-epoxycyclohexylmethyl) citraconate, bis(3,4-epoxycyclohexylmethyl) isocitraconate, bis(3,4-epoxy - 6 - methylcyclohexylmethyl) fumarate, bis(3,4-epoxycyclohexylmethyl) pimelate, bis(3,4-epoxycyclohexylmethyl) terephthalate, bis(3,4-epoxycyclohexylmethyl) azelate, bis(3,4-epoxycyclohexylmethyl) sebacate, bis(3,4-epoxycyclohexylmethyl) itaconate, bis(3,4-epoxycyclohexylmethyl) hexahydrophthalate, bis(3,4-epoxycyclohexylmethyl) phthalate, bis(3,4 - epoxycyclohexylmethyl) glutaconate, bis(3,4-epoxycyclohexylmethyl) hydromuconate, and the like.

Other desirable polyepoxides include the monoesters of 3,4-epoxycyclohexylmethanols and 3,4-epoxycyclohexanecarboxylic acids such as, for example, 3,4-epoxycyclohexylmethyl 3,4 - epoxycyclohexanecarboxylate, 1-methyl-3,4-epoxycyclohexylmethyl 1-methyl-3,4-epoxycyclohexanecarboxylate, 6-methyl-3,4-epoxycyclohexylmethyl 6-methyl-3,4-epoxycyclohexanecarboxylate, 2-ethyl-3,4-epoxycyclohexylmethyl 2-ethyl-3,4-epoxycyclohexanecarboxylate, 4-n-propyl-3,4-epoxycyclohexylmethyl 4-n-propyl-3,4-epoxycyclohexanecarboxylate, 5-isobutyl-3,4-epoxycyclohexylmethyl 5-isobutyl-3,4-epoxycyclohexanecarboxylate lower alkyl substituted-3,4-epoxycyclohexylmethyl lower alkyl substituted-3,4-epoxycyclohexanecarboxylate, halo substituted-3,4 - epoxycyclohexylmethyl halo substituted-3,4-epoxycyclohexanecarboxylate, 1-chloro-3,4-epoxycyclohexylmethyl 1-chloro-3,4-epoxycyclohexanecarboxylate, 2-bromo-3,4-epoxycyclohexylmethyl 2-bromo-3,4-epoxycyclohexanecarboxylate, and the like.

Still other desirable polyepoxides include, by way of illustration, the 3 - oxatetracyclo[4.4.0.1$^{7,10}$.0$^{2,4}$]undec - 8 - yl vicinal-epoxyalkyl ethers, the 3 - oxatetracyclo[4.4.0.1$^{7,10}$.0$^{2,4}$]undec - 8 - yl vicinal epoxycycloalkyl ethers, the 3 - oxatetracyclo[4.4.0.1$^{7,10}$.0$^{2,4}$]undec - 8 - yl vicinal-epoxycycloalkylalkyl ethers, the 3-oxatetracyclo[4.4.0.1$^{7,10}$.0$^{2,4}$]undec - 8 - yl 3-oxatricyclo[3.2.1.0$^{2,4}$]oct-6-yl ethers, the 3 - oxatetracyclo[4.4.0.1$^{7,10}$.0$^{2,4}$]undec-8-yl 3-oxatricyclo[3.2.1.0$^{2,4}$]oct-6-ylalkyl ethers, and the like.

Specific examples include 3-oxatetracyclo[4.4.0.1$^{7,10}$.0$^{2,4}$]undec-8-yl 2,3 - epoxypropyl ether, 3 - oxatetracyclo[4.4.0.1$^{7,10}$.0$^{2,4}$]undec-8-yl 3,4-epoxybutyl ether, 3-oxatetracyclo[4.4.0.1$^{7,10}$.0$^{2,4}$]undec-8-yl 2,3 - epoxybutyl ether, 3-oxatetracyclo[4.4.0.1$^{7,10}$.0$^{2,4}$]undec-8-yl 3,4-epoxyhexyl ether, 3-oxatetracyclo[4.4.0.1$^{7,10}$.0$^{2,4}$]undec-8-yl 5,6-epoxyhexyl ether, 3-oxatetracyclo[4.4.0.1$^{7,10}$.0$^{2,4}$]undec-8-yl 7,8-epoxyoctyl ether, 3-oxatetracyclo[4.4.0.1$^{7,10}$.0$^{2,4}$]undec - 8 - yl 2-methyl-2,3-epoxypropyl ether, 3-oxatetracyclo[4.4.0.1$^{7,10}$.0$^{2,4}$]undec-8-yl 2 - ethyl - 2,3-epoxyhexyl ether, 3 - oxatetracyclo[4.4.0.1$^{7,10}$.0$^{2,4}$]undec-8-yl 9,10 - epoxystearyl ether, 3-oxatetracyclo[4.4.0.1$^{7,10}$.0$^{2,4}$]undec-8-yl 9,10,12,13 - diepoxystearyl ether, 3-oxatetracyclo[4.4.0.1$^{7,10}$.0$^{2,4}$]undec - 8 - yl 2,3-epoxycyclopentyl ether, 3-oxatetracyclo[4.4.0.1$^{7,10}$.0$^{2,4}$]undec-8-yl 2,3-epoxycyclopentylmethyl ether, 3-oxatetracyclo[4.4.0.1$^{7,10}$.0$^{2,4}$]undec - 8 - yl alkyl substituted 3,4-epoxycyclohexyl ether, 3-oxatetracyclo[4.4.0.1$^{7,10}$.0$^{2,4}$]undec-8-yl 3,4-epoxycyclohexyl ether, 3-oxatetracyclo[4.4.0.1$^{7,10}$.0$^{2,4}$]undec-8-yl 2,3-epoxycyclohexyl ether, 3-oxatetracyclo[4.4.0.1$^{7,10}$.0$^{2,4}$]undec-8-yl 3,4-epoxycyclohexylmethyl ether, 3-oxatetracyclo[4.4.0.1$^{7,10}$.0$^{2,4}$]undec-8-yl 6 - methyl-3,4-epoxycyclohexylmethyl ether, 3 - oxatetracyclo[4.4.0.1$^{7,10}$.0$^{2,4}$]undec-8-yl 5-methyl-3,4-epoxycyclohexylmethyl ether, 3-oxatetracyclo[4.4.0.1$^{7,10}$.0$^{2,4}$]undec - 8 - yl alkyl substituted 3-oxatricyclo[3.2.1.0$^{2,4}$]oct-6-yl ether, 3-oxatetracyclo[4.4.0.1$^{7,10}$.0$^{2,4}$]undec-8-yl 3 - oxatricyclo[3.2.1.0$^{2,4}$]oct-6-yl ether, and the like.

Examples of other monomeric polyepoxides, include 1,4-bis(2,3-epoxypropoxy)benzene,
1,3-bis(2,3-epoxypropoxy)benzene,
4,4'-bis(2,3-epoxypropoxy) diphenyl ether,
1,8-bis(2,3-epoxypropoxy) octane,
1,4-bis(2,3-epoxypropoxy)cyclohexane,
4,4'-bis(2 - hydroxy-3,4'-epoxybutoxy)diphenyl dimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Examples of vic-epoxyhydrocarbyl substituted aromatic hydrocarbons and halo-substituted aromatic hydrocarbons include, among others, 1,4-bis(2,3-epoxypropyl)benzene,
1,4-bis(2,3-epoxycyclohexyl)benzene,
1,4-bis(2,3-epoxybutyl)benzene,
1,3-bis(2,3-epoxypropyl)benzene,
1,4-bis(2,3-epoxyhexyl)benzene,
1-(3,4-epoxypentyl)-4-(2,3-epoxypropyl)benzene,
1,2-di(2,3-epoxypropyl)benzene,
4,4'-bis(2,3-epoxypropyl)diphenyl,
1,5-bis(2,3-epoxypropyl)naphthalene,
2,6-bis(2,3-expoxypropyl)naphthalene,
1,4-bis(2,3-epoxypropyl) - 2,3,5,6 - tetramethyl benzene, and the like.

Other polyepoxides contemplated include the polyglycidyl polyethers which can be advantageously used as a component in the curable compositions of this invention. These polyepoxides can be characterized by their epoxy equivalents and melting points, or melting point ranges. By the term "epoxy equivalent," as used herein, is meant the weight of polyglycidyl polyether which contains one mole of epoxy group. The epoxy equivalent can be determined by heating a one gram sample of the polyglycidyl polyether with a pyridine solution containing a known quantity of pyridine hydrochloride for about one hour and titrating with sodium hydroxide or potassium hydroxide to determine the amount of unreacted pyridine hydrochloride. From this, the amount of pyridine hydrochloride that has reacted with the epoxy groups of the polyglycidyl polyether can be calculated. From these data the number of grams of polyglycidyl polyether per epoxy group contained thereby, that is, the epoxy equivalent, can be determined by taking one mole of pyridine hydrochloride as equivalent to one mole of epoxy group. Melting point ranges, as used herein, were determined by the Durran's Mercury Method.

Many methods are known in the art for preparing polyglycidyl polyethers. They can be advantageously prepared by the reaction of halohydrins, such as, monohalohydrins, polyhalohydrins, epihalohydrins and the like, with polyhydric phenols. An advantageous method for such a preparation is to heat a dihydric phenol with epichlorohydrin in the presence of sufficient caustic alkali, or other strong aqueous alkali, e.g., potassium hydroxide, to combine with the chlorine of epichlorohydrin. It is preferable to use a stoichiometric excess of alkali so as to ensure the complete combination of chlorine. Theoretically, one mol of epichlorohydrin will react with one hydroxyl group of polyhydric phenol to form the polyglycidyl polyether of the phenol. For example, two mols of epichlorohydrin are theoretically required to react with one mol of a dihydric phenol to form the diglycidyl diether of the phenol. In practice, however, a higher ratio than two mols of epichlorohydrin per mol of dihydric phenol has been required in order to form the diglycidyl diether of the phenol. The chain length and extent of polymerization can be varied by changing the mol ratio of epichlorohydrin to dihydric phenol within the range of 10:1 to 1.2:1. Thus, by decreasing the mol ratio of epichlorohydrin to dihydric phenol from 10 towards 1.2, polyglycidyl polyethers having longer chain lengths, higher epoxy equivalents and higher softening points can be obtained. The reaction temperature can be preferably controlled at from 25° C. to 100° C. by regulating the amount of water in the aqueous alkali added or by cooling the walls of the reaction vessel with a circulating cooling medium or by any other suitable cooling means. Towards the end of the reaction the addition of heat may be required to maintain the temperature of the reaction mixture at the desired level within the range from 50° C. to 100° C. The overall reaction time can be made to vary from thirty minutes to three hours, or more, depending upon the temperature, proportion of reactants, and method of mixing the reactants. The polyglycidyl polyether product can be recovered from the reaction mixture by methods well recognized in the art.

The lower molecular weight polyglycidyl polyethers which can be formed as described above can be further polymerized by heating with less than equivalent amounts of the same, or different polyhydric phenol, to form longer chain polyglycidyl polyethers. For example, a diglycidyl diether of a dihydric phenol can be mixed with a less than equivalent amount of the same or different dihydric phenol. In further polymerizing polyhydric phenols and low molecular weight polyglycidyl polyethers formed by the reaction of a halohydrin and a polyhydric phenol, the phenol and epoxide can be mixed and heated with or without a catalyst. By heating the mixture without a catalyst, polymerization takes place but at a slower rate. Catalyst suitable for accelerating the rate of reaction include alkalis and alkaline reacting substances, acids, salts, basic nitrogen compounds, metallic surfaces, and the like.

Typical halohydrins which can be used in the preparation of the polyglycidyl polyethers include monohalohydrins, e.g., 3-chloro-1,2-propanediol; polyhalohydrins, e.g., glycerol dichlorohydrin, bis(3-chloro-2-hydroxypropyl) ether, bis(3 - chloro - 2 - methyl-2-hydroxypropyl) ether, 2-methyl-2-hydroxy-1,3-dichloropropane, 1,4-dichloro-2,3-dihydroxybutane, and the like; and epihalohydrins, e.g., epichlorohydrin which is preferred. Illustrative of polyhydric phenols which can be used in preparaing polyglycidyl polyethers are mononuclear phenols and polynuclear phenols. Typical polyhydric phenols include resorcinol, catechol, hydroquinone, phloroglycinol and the like. Typical polynuclear phenols include p,p'-dihydroxydibenzyl,
p,p'-biphenol,
p,p'-dihydroxyphenyl sulfone,
p,p'-dihydroxybenzophenone,
2,2'-dihydroxy-1,1'-dinaphthylmethane, and the 2,2'; 2,3'; 2,4'; 3,3'; 3,4'; and 4,4'' isomers of
dihydroxydiphenylmethane,
dihydroxydiphenyldimethylmethane,
dihydroxydiphenylethylmethylmethane,
dihydroxydiphenylmethylpropylmethane,
dihydroxydiphenylethylphenylmethane,
dihydroxydiphenylpropylphenylmethane,
dihydroxydiphenylbutylphenylmethane,
dihydroxydiphenyltolylmethane,
dihydroxydiphenyltolylmethylmethane,
dihydroxydiphenyldicyclohexylmethane,
dihydroxydiphenylcyclohexane, polyhydric phenolicformaldehyde condensation products, and the like. Preferred polyglycidyl polyethers are those which contain as reactive groups only epoxy groups and hydroxyl groups. These preferred polyglycidyl polyethers have melting points or melting point ranges of not greater than 160° C.

The epoxidized polymers which can be cured with the uranium catalysts of this invention are polymeric molecules which contain, on the average, at least one vicinal epoxy group, i.e.,

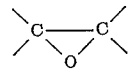

and preferably, a plurality of vicinal epoxy groups. These epoxidized polymers can be prepared by the epoxidation of the corresponding olefinically unsaturated polymer precursor which has an average molecular weight in the range of from about 250 to about 250,000, and higher, preferably from about 250 to about 25,000, and preferably still, from about 500 to about 10,000. The term "average" is to be noted since the individual molecules of a given sample of olefinically unsaturated polymeric product which result from the polymerization reaction of the appropriate monomeric reagent(s), in general, vary in molecular weight (or degree of polymerization). Consequently, the overall molecular weight of the sample is the average of the molecular weight of the individual polymeric molecules which comprise said sample.

In a broad aspect, the epoxidized polymers which are contemplated include, among others, the partially to essentially completely epoxidized polymers of conjugated dienes; the partially to essentially completely epoxidized copolymers of conjugated dienes with olefinic monomers; and the like. The term "polymer," as employed herein including the appended claims, is used in its generic sense to encompass homopolymers and copolymers. It is pointed out, also, that the term "partially to essentially completely epoxidized" (polymers or copolymers) means that the epoxidized polymers which are useful in the invention can range from those which contain, on the average, at least one single vicinal epoxy group and, on the average, a plurality of ethylenic groups to those which contain, on the average, a plurality of vicinal epoxy groups and relatively few, or none, ethylenic groups. As a practical matter, especially from a commercial standpoint, it is somewhat difficult and expensive to fully and completely epoxidize the olefinically unsaturated polymer precursor.

In one aspect, the epoxidized polymers which are contemplated as a component(s) in the novel curable compositions contain at least one percent oxirane oxygen to below about 23 percent oxirane oxygen, and preferably, from about 3 to about 12 percent oxirane oxygen. The term "percent oxirane oxygen" designates the number of grams of oxirane oxygen per 100 grams of a sample of epoxidized polymer. The upper limit regarding the percent oxirane oxygen is a variable which will depend upon the average molecular weight of the olefinically unsaturated polymer precursor, the degree of epoxidation of the olefinically unsaturated polymer precursor, the monomers employed to prepare said precursor, the degree and number of side reactions which can occur during the epoxidation reaction other than that of introducing oxirane oxygen at the site of the ethylenic carbon to carbon double bond of said precursor, and the like. Nevertheless, the invention contemplates the use of essentially completely epoxidized polymers, and consequently, the determination of the upper limit of percent oxirane oxygen is readily determined via ordinary experimentation by a chemist. However, it must be borne in mind that with regard to the upper limit of percent oxirane oxygen, this limit is a variable governed by practical and readily determined factors such as those illustrated above.

The conjugated dienic monomers which are useful in preparing the non-epoxidized polymers, i.e., the olefinically unsaturated polymer precursors, are characterized by the unit,

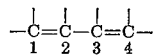

whereas the olefinic monomers are characterized by at least one

unit. It is apparent, therefore, that the olefinic monomer can contain more than one

unit; however, said olefinic monomer is non-conjugated. It is desirable to exclude conjugated dienic monomers which contain so-called negative substituents, e.g., chloro, bromo, and cyano, monovalently bonded to the carbon atoms designated by the numerals 2 and 3

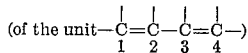

Such conjugated dienic monomers can undergo what is known as 1,4-addition polymerization, e.g., in the homopolymerization of 1,3-butadiene, to yield a polymer containing the unit,

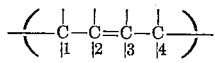

However, the presence of negative groups on the ethylenic carbon atoms of polymers which result from the 1,4-addition route tends to inactivate the ethylenic group toward epoxidation, i.e., the introduction of oxirane oxygen at the site of the resulting carbon to carbon double bond is difficult when negative groups are attached to the ethylenic carbon atoms of the polymer.

Specific illustrative conjugated dienic monomers which are useful in the preparation of the non-epoxidized polymers include, for example, 1,3-butadiene, 1-methyl-1,3-butadiene, 2-methyl-1,3-butadiene, 2-ethyl-1,3-butadiene, 1,1-dimethyl-1,3-butadiene, 1,4-dimethyl-1,3-butadiene, 2,3-dimethyl-1,3-butadiene, 2-isopropyl-1,3-butadiene, 1n-propyl-1,3-butadiene, 1-phenyl-1,3-butadiene, 1-ethoxy-1,3-butadiene, 1-acetoxy-1,3-butadiene, 1-allyl-1,3-butadiene, 2-methyl-6-methylene-2,7-octadiene, and the like. Conjugated dienic hydrocarbon monomers which contain from 4 to 8 carbon atoms are preferred in the preparation of the non-epoxidized homopolymers and copolymers. Conjugated butadiene is most preferred.

Exemplary olefinic monomers which are useful in the preparation of the non-epoxidized copolymers include, for instance, ethylene, propylene, isobutylene, butene-1, styrene, vinyltoluene, isopropenylbenzene, 4-vinylcyclohexene, divinylbenzene, vinyl chloride, allyl chloride, alpha-methylstyrene, alpha-chlorostyrene, 2,5-dichlorostyrene, 4-cyanostyrene, 2-hydroxystyrene, 2-acetoxystyrene, chlorotrifluoroethylene, vinylidene chloride, vinyl fluoride, vinylidene fluoride, vinyl bromide, methyl acrylate, methyl methacrylate, ethyl methacrylate, octyl methacrylate, methyl crotonate, butyl crotonate, ethyl crotonate, dimethyl maleate, dibutyl maleate, dioctyl maleate, diethyl chloromaleate, diethyl fumarate, vinyl acetate, vinyl butyrate, vinyl 2-ethylhexanoate, vinyl stearate, vinyl oleate, vinyl linoleate, vinyl benzoate, vinyl crotonate, allyl acetate, acrylonitrile, methylacrylonitrile, acrylamide, methacrylamide, crotonamide, N-vinylbenzamide, N-vinylbutyramide, methyl vinyl ketone, methyl isopropenyl ketone, acrolein, vinyl ethyl ether, vinyl butyl ether, 2-vinylpyridine, N-vinylcarbazole, and the like. Preferred olefinic monomers include the alkenes, the phenyl substituted-alkenes, the olefinically unsaturated organic esters, the olefinically unsaturated amides, the olefinically unsaturated nitriles, and the like. Styrene, the lower alkyl acrylates, and the alkenes which contain up to 5 carbon atoms are most preferred.

The preparation of the non-epoxidized homopolymers and copolymers is well documented in the literature. For example, U.S. Patents 2,500,933, 2,586,594, and 2,631,175 are illustrative of the reagents and modes for preparing various non-epoxidized polymers. Liquid polybutadiene which has an average molecular weight of at least 250 is highly preferred.

The preparation of the epoxidized polymers which are employed as a component(s) in the novel curable, polymerizable compositions can be accomplished by epoxidizing the corresponding olefinically unsaturated homopolymer or copolymer precursors such as those exemplified previously with well known epoxidizing agents, and preferably with organic peracids. Since the epoxidation reaction is carried out in a liquid phase, practical considerations are readily suggested to the chemist skilled in the epoxy art. Thus, if the olefinically unsaturated homopolymer of copolymer precursor is a liquid, then an inert normally liquid organic solvent is not essential, though one can be employed if desired. However, if the unsaturated homopolymer or copolymer precursor is a solid, then said solid precursor should be soluble in an inert normally liquid organic vehicle in order for it to undergo effective epoxidation. Inert organic vehicles such as chloroform, toluene, benzene, ethylbenzene, xylene, acetone, methyl ethyl ketone, butyl acetone, ethyl acetate, and the like, are illustrative of the common solvents which may be employed. The particular homopolymer or copolymer precursor, its degree of polymerization, i.e., its average molecular weight, its preparation, and other factors, will influence, to a large extent, the solubility of said precursor in any given inert normally liquid organic vehicle. It is readily recognized by polymer chemists that many highly polymerized compounds are solids of extremely limited solubility in otherwise useful inert organic media, and in this respect, a practical upper limit is imposed on the degree of polymerization of the olefinically unsaturated homopolymer or copolymer precursor. Thus, the solid non-epoxidized olefinically unsaturated polymers which are contemplated are soluble in an inert normally liquid vehicle, the choice of said inert normally liquid vehicle being readily determined by the merest of routine experimentation by the artisan in the epoxy art.

Other useful polyepoxides include epoxides derived from natural oils, such as linseed oil epoxide, soybean oil epoxide, safflower oil epoxide, tung oil epoxide, castor oil epoxide, lard oil epoxide, and the like, which are glycerides containing 45 to 80 carbon atoms.

The uranium catalysts of the instant invention can also be employed to cure monoepoxides, i.e., compounds containing only one vicinal epoxy group, which may be present as part of a cycloaliphatic nucleus or part of an aliphatic chain. Typical monoepoxide compounds include ethylene oxide, propylene oxide, 1,2-epoxyoctane, cyclohexene oxide, 1,2-epoxypropyl benzene, and the like.

It should be noted that the aforementioned epoxides are given only for purposes of illustrating the wide variety of monoepoxides and polyepoxides which can be cured by the catalysts of the instant invention and no unnecessary limitations are to be inferred therefrom.

The epoxides with the uranium catalyst of the type illustrated above can be homopolymerized or copolymerized with an active organic hardener or combination of active organic hardeners. By the term "active organic hardener," as used herein, is meant an organic compound which contains two or more groups which are reactive with epoxy groups. The active organic hardeners illustrated hereinafter are employed in a curing amount, that is, an amount which is sufficient to cause the epoxide system containing the active organic hardener(s) to become polymerized. The active organic hardeners can also be employed in varying amounts so as to give a wide variety of properties to the cured epoxide system. Typical groups which are reactive with epoxy groups are active hydrogen groups such as hydroxyl groups, carboxyl groups, thiol groups, and the like; and isocyanate groups, halide atoms of acyl halides, and the like. Oxydicarbonyl groups such as those contained by polycarboxylic acid anhydrides are also active with epoxy groups. One oxydicarbonyl group will react with two epoxy groups and, in this connection, polycarboxylic acid anhydrides need only contain one oxydicarbonyl group in order to funtcion as an active organic hardener with the epoxide compositions of this invention. Thus, one oxydicarbonyl group of an anhydride is equivalent to two epoxy-reactive groups.

Representative active organic hardeners include monocarboxylic acids, polycarboxylic acids, polycarboxylic acid anhydrides, polyols, i.e., polyhydric phenols and polyhydric alcohols, polythiols, polyisocyanates, polyacyl halides and others.

One class of active organic hardeners which can be reacted with the polyepoxide compositions above, are the monocarboxylic and polycarboxylic acids. By the term "polycarboxylic acid," as used herein, is meant a compound or polymer having two or more carboxyl groups to the molecule. Curable mixtures can be formed from the polyepoxide compositions and carboxylic acids, which mixtures can be cured to produce a wide variety of useful products. Valuable resins can be made from mixtures containing such amounts of an epoxide composition and a carboxylic acid as to provide 0.1 to 1.25 carboxyl groups of the acid for each epoxy group contained by the amount of the epoxide composition. It is preferred, however, to make resins from curable mixtures which contain such amounts of carboxylic acids and epoxide compositions as to provide 0.2 to 0.8 carboxyl groups of the acid for each epoxy groups from the epoxide composition.

Illustrative monocarboxylic acids which can be employed include, acetic, propionic, butyric, valeric, caproic, enanthic, caprylic, pelargonic, capric, henecanoic, lauric, tridecanoic, myristic, pentadecanoic, palmitic, stearic, acrylic, methacrylic, crotonic, 3-butenoic, sorbic, and the like.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycollic acid, dilactic acid, thiodiglycollic acid, 4-amyl-2,5-heptadienedioic acid, 3-hexynedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorophthalic acid, 1,8-napthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl,1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, polymerized fatty acids derived from natural oils, e.g., linseed oil, tung oil, soybean oil, dehydrated castor oil, etc., including mixtures thereof, which have a molecular weight within the range of 500 to 5000, and the like.

Also, as polycarboxylic acids useful in the polymerizable compositions there are included compounds containing ester groups in addition to two or more carboxy groups which can be termed polycarboxy polyesters of polycarboxylic acids, such as those listed above, or the corresponding anhydrides of said acids, esterified with polyhydric alcohols. Thus, by the term "polycarboxy polyesters," as used herein, is meant polyesters containing two or more carboxy groups per molecule. These polycarboxy polyesters can be prepared by known condensation procedures, employing mol ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant.

Curable mixtures containing the epoxide compositions and polycarboxylic acid anhydrides can also be employed to produce resins having diversified and valuable properties. Particularly valuable resins can be made from mixtures containing such amounts of polycarboxylic acid anhydride and epoxide compositions as to provide 0.1 to 3.0 carboxy equivalent of the anhydride for each epoxy group of the epoxide composition. It is preferred, however, to make resins from curable mixtures which contain such amounts of polycarboxylic acid anhydride and epoxide composition as to provide 0.3 to 2.0 carboxy equivalent of anhydride for each epoxy group contained by the amout of epoxide concentration.

The polycarboxylic acid anhydrides contemplated as active organic hardeners in the invention include the aliphatic, aromatic, and cycloaliphatic acid anhydrides. Among suitable anhydrides are the ethylenically unsaturated polycarboxylic acid anhydrides including for example, the ethylenically unsaturated hydrocarbon dicarboxylic acid anhydrides, i.e., those which contain a polymerizable ethylenic carbon to carbon double bond. Illustrative polycarboxylic acid anhydrides include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, tetrahydrophthalic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, tetraiosophthalic anhydride, lower alkyl substituted - bicyclo[2.2.1] - hept-5-ene-2,3-dicarboxylic anhydride, methylbicyclo[2.2.1]hept-5-ene-2,3-dicarboxylic anhydride, and the like. Polymeric anhydrides or mixed polymeric anhydrides of sebacic, adipic, pimelic, cyclohexane-1,4-dicarboxylic, terephthalic, and isophthalic acids are also contemplated. Mixtures of polycarboxylic acid anhydrides also can be employed.

The polyols contemplated as active hardener components in the curable formulations include those organic compounds which have at least two hydroxy groups, which are alcoholic hydroxy groups, phenolic hydroxy groups, or both alcoholic and phenolic hydroxy groups. The term "polyol" preferably encompasses the polyhydric alcohols and the polyhydric phenols. The polyhydric alcohols, i.e., those composed solely of carbon, hydrogen, and oxygen, are highly preferred. Illustrative of the polyols contemplated include, for example, the aliphatic and cycloaliphatic polyhydric alcohols, e.g., ethylene glycol, diethylene glycol, the polyethylene glycols, propylene glycol, the polypropylene glycols, the polyethylenepolypropylene glycols, trimethylene glycol, the butanediols, the butenediols, the pentanediols, the pentenediols, 2-ethyl-1,3-hexanediol, the hexenediols, 2-methoxy-2,3-dimethyl-1,5-pentanediol, 12,13-tetracosanediol, polyglycerol, 1,1,1-trimethylolpropane, trimethylolphenyl allyl ether, pentaerythritol, sorbitol, the polyvinyl alcohols, the octenediols, the cyclopentanediols, the cyclohexanediols, the lower alkyl substituted-cyclohexanediols, inositol, trimethylolbenzene; and the polyhydric phenols, e.g., resorcinol, catechol, pyrogallol, hydroquinone, the dihydroxytoluenes, dihydroxyxylene, bis(4-hydroxyphenyl)-2,2-propane, bis(4-hydroxyphenyl)methane, 1,8-naphthalenediol, the polyhydric phenol-formaldehyde condensation products, and the like. The alkylene oxide adducts, e.g., ethylene oxide, propylene oxide, etc., of polyhydric alcohols or polyhydric phenols also are highly suitable. Moreover, the reaction product of polycarboxylic acid anhydrides and alkylene oxide adducts of polyols can also be employed. Mixtures of polyols are also suitable.

Polyols prepared by the reaction of polyhydric alcohols or polyhydric phenols which contain at least three hydroxy groups with an aliphatic monocarboxylic acid (described hereinafter) to give an esterified product mixture having at least an average of two free or uneffected hydroxy groups, also, are useful. For example, one mol of glycerol can be reacted with one mol of an aliphatic monocarboxylic acid to give a mixture of glycerides which contain an average of two free hydroxy groups per glyceride molecule in the reaction product. In addition, polyols prepared by the reaction of polyepoxides such as limonene dioxide, 4 - vinylcyclohexene dioxide, bis(2,3-epoxycyclopentyl) ether, dicyclopentadiene dioxide, divinylbenzene dioxide, 3,4-epoxy-6-methylcyclohexylmethyl 3,4-epoxy-6-methylcyclohexanecarboxylate, diethylene glycol bis(3,4-epoxycyclohexanecarboxylate), bis(3,4-epoxycyclohexylmethyl) pimelate, 1,1,1-trimethylolpropane tris(3,4-epoxycyclohexanecarboxylate), and the like; with an aliphatic monocarboxylic acid, e.g., hexanoic acid, caprylic acid, lauric acid, capric acid, myristic acid, oleic acid, linoleic acid, oleostearic acid, licanic acid, ricinoleic acid, hexenoic acid, hexadienoic acid, octenoic acid, and the like; preferably at elevated temperatures, e.g., about 25° to about 250° C.; with or without a catalyst; can be employed as the polyol component in the curable systems. The concentration of monocarboxylic acid employed is, at the lower limit, an amount which is sufficient to react with all the epoxy groups contained by the polyepoxide reagent to thus produce an esterified product which contains ester groups,

and generated hydroxy groups, —OH. It should be borne in mind that for each epoxy group that is reacted with a carboxy group, there is formed an ester group and a hydroxy group. The upper limit of the concentration of monocarboxylic acid which can be employed is an amount required to react with all the epoxy groups contained by the polyepoxide plus an amount required to esterify all the generated hydroxy groups save two. Thus, the reaction product is aptly termed a "polyhydric polyester." By way of illustration, for example, if the polyepoxide is a diepoxide, e.g., 4-vinylcyclohexene dioxide, then the concentration of monocarboxylic acid necessary for the above-said reaction is an amount which would provide a ratio of one carboxy group of said acid per epoxy group of said diepoxide. Expressed on a molar basis for convenience, two mols of said acid per one mol of said diepoxide are necessary. The resulting product in this illustration would be a diol diester. By way of a further illustration, for instance, if the polyepoxide is a triepoxide, e.g., 1,1,1-trimethylolpropane tris(3,4-epoxycyclohexanecarboxylate), then the minimum concentration of monocarboxylic acid necessary would be an amount which would provide a ratio of one carboxy group of said acid per epoxy group of said triepoxide. Again expressed on a molar basis for convenience, three mols of said triepoxide are necessary to obtain the triol triester product. It is apparent, therefore, that four mols of said acid per mol of said triepoxide would have resulted in a diol tetraester product. For this particular illustration, the upper limit of monocarboxylic acid would be an amount which provides a ratio of 1.33 carboxyl groups of acid per epoxy group of said triepoxide. To avoid any misinterpretation the following equation is set forth:

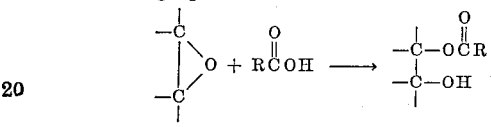

wherein the epoxy group is contained by the polyepoxide molecule, and wherein

is the aliphatic monocarboxylic acid. The above equation illustrates the mechanism by which a hydroxy group and an ester group are formed.

Thermoset resins can be prepared from mixtures containing the epoxide compositions and polyols by providing 0.1 to 2.0, preferably from 0.2 to 1.5, hydroxyl groups of the polyol for each epoxy group contained by the amount of the epoxide composition. The epoxide composition and polyol can be mixed in any convenient manner. A preferred method, however, is to mix the polyol and epoxide composition in the liquid state so as to obtain a uniform mixture. In forming this mixture it may be necessary to raise the temperature of the polyol and epoxide composition to at least the melting point or melting point range of the highest melting component. Temperatures below about 150° C. are preferred so as to avoid possible premature curing of these curable mixtures. Stirring also aids the formation of a homogeneous mixture.

The following examples are illustrative:

*Example 1*

To 50 grams of 3,4-epoxy-6-methylcyclohexylmethyl 3,4-epoxy-6-methylcyclohexanecarboxylate was added 20 grams of the reaction product of maleic anhydride and the propylene oxide adduct of glycerol (the adduct having a mol. wt. of 265) and 0.33 gram (0.5 weight percent) uranyl nitrate hexahydrate. All of the ingredients were mixed at room temperature whereupon the mixture exothermed to 171° C. in 6 minutes. A hard resin was obtained.

*Example 2*

To 1.53 grams of 3,4-epoxy-6-methylcyclohexlymethyl 3,4 - epoxy-6-methylcyclohexanecarboxylate was added 1.01 grams of sebacic acid and 0.0224 gram of uranyl butyrate. The mixture gelled in 2 minutes at 120° C. A hard, tough resin was obtained.

*Example 3*

To 1.53 grams of 3,4 - epoxy - 6 - methylcyclohexylmethyl 3,4 - epoxy - 6 - methylcyclohexanecarboxylate was added 0.9 gram of methyl Nadic anhydride (methylbicyclo - [2.2.1]heptane - 2,3-dicarboxylic anhydride) and 0.0224 gram of uranyl butyrate. The mixture gelled in 2 minutes at 120° C. A hard, tough resin was obtained.

*Example 4*

To 20 grams of 3,4 - epoxy-6-methylcyclohexylmethyl 3,4 - epoxy-6-methylcyclohexanecarboxylate was added 0.05 gram (0.25 weight percent) of uranyl butyrate. The uranyl butyrate catalyst dissolved upon warming the mixture to about 50° C. Upon further heating to about 85° C., the mixture started exotherming strongly and gelled in less than one minute. A hard, strong resin was obtained.

Example 5

To 20 grams of diethylene glycol bis-(3.4-epoxy-cyclohexanecarboxylate) was added 0.05 gram (0.25 weight percent) of uranyl nitrate hexahydrate dissolved in 0.05 gram of ethylene glycol. Thereafter the mixture was heated to 120° C. and placed in an oven at 160° C. Gelation occurred in 43 minutes. After heating for 3 hours at 160° C., an extremely tough resin was obtained which had a Shore Durometer D hardness of 81.

Examples 6–11

In the following examples, various epoxides were admixed in the proportions indicated with the designated uranium catalyst. Unless otherwise noted, each of the formulations was heated to 120° C. and then placed in an oven at 160° C. until gelling occurred. The results are shown below in Table I:

Example 13

A solution was prepared by dissolving 0.0015 gram (0.005 weight percent) of uranyl nitrate hexahydrate in 11.2 grams of the acids employed in the preceding example. Thereafter 18.8 grams of 3,4-epoxy-6-methylcyclohexylmethyl 3,4 - epoxy-6-methylcyclohexanecarboxylate were added and the mixture heated to 90° C. and then placed in an oven at 160° C. Gelation occurred within 25 minutes and a hard, tough resin was obtained after 4 hours cure at 160° C.

Examples 14–29

In the following examples the uranium catalyst was first dissolved in the polymerized fatty acids employed in the preceding examples in the proportions indicated in Table II. Thereafter, the 3,4-epoxy-6-methylcyclohexylmethyl 3,4 - epoxy-6-methylcyclohexanecarboxylate was

TABLE I.—CATALYTIC ACTIVITY FOR HOMOPOLYMERIZATION OF EPOXIDES

| Example | Epoxide | Grams | Catalyst | Grams | Gel Time [1] in minutes |
|---|---|---|---|---|---|
| 6 | 3,4-epoxy-6-methylcyclohexylmethyl 3,4-epoxy-6-methylcyclohexanecarboxylate. | 20 | Uranyl butyrate | 0.05 | [2]<1 |
| 7 | ---do--- | 20 | Uranium tetraoctoate | 0.1 | 3 |
| 8 | ---do--- | 20 | Uranyl nitrate hexahydrate. | 0.06 | 10 |
| 9 | Diethylene glycol bis-(3,4-epoxycyclohexanecarboxylate) | 20 | Uranyl butyrate | 0.05 | [2] 12 |
| 10 | Vinylcyclohexene dioxide | 20 | ---do--- | 0.05 | [2][3]<1 |
| 11 | Bis-(3,4-epoxy-6-methylcyclohexylmethyl) adipate | 20 | ---do--- | 0.05 | 38 |

[1] Formulation heated to 120° C. and then placed in an oven at 160° C. Times measured from the time formulation placed in oven.
[2] Heated to 85° C.
[3] Catalyst dissolved in 0.05 gram ethylene glycol.

Example 12

A solution was prepared by dissolving 1.0 gram (2 weight percent) of uranyl nitrate hexahydrate in 18.7 grams of polymerized fatty acids with warming. The polymerized fatty acids employed are sold under the trademark Empol 1022 and consist largely of a $C_{36}$ dibasic dimer acid produced by the polymerization of unsaturated 18 carbon atom fatty acids. The acids are characterized by an acid value of 180; a saponification value of 185; and a specific gravity of 0.95 at 15.5° C. After cooling the solution to room temperature, 31.3 grams of 3,4 - epoxy-6-methylcyclohexylmethyl 3,4-epoxy-6-methylcyclohexanecarboxylate were stirred in. The mixture gelled in about 10 minutes at room temperature, and after curing at room temperature gave a strong resin with a Shore Durometer D hardness of 77. The peak exotherm was 94° C. in 16 minutes.

added and the mixtures heated, or allowed to exotherm, to the indicated temperatures. As shown below, the effectiveness of the uranium catalysts provides a short gel time as compared to the non-catalyzed control:

TABLE II.—CATALYTIC ACTIVITY FOR COPOLYMERIZATION OF EPOXIDES WITH CARBOXYLIC ACIDS

| Example | Grams of Epoxide [1] | Grams of Acid [2] | Carboxyl/Epoxide Ratio | Catalyst | Grams | Oven Temp., °C. | Formulation[3] Temp., °C. | Gel Time in Minutes [4] |
|---|---|---|---|---|---|---|---|---|
| 14 | 31.3 | 18.7 | 0.3 | Uranyl nitrate hexahydrate | 1.0 | 22 | 22 | 10 |
| 15 | 18.8 | 11.2 | 0.3 | ---do--- | 0.0015 | 160 | 90 | 25 |
| 16 | 18.8 | 11.2 | 0.3 | ---do--- | 0.03 | 120 | 90 | 8 |
| 17 | 18.8 | 11.2 | 0.3 | ---do--- | 0.03 | 160 | 90 | 3 |
| 18 | 18.8 | 11.2 | 0.3 | ---do--- | 0.003 | 160 | 90 | 15 |
| 19 | 18.8 | 11.2 | 0.3 | None | | 160 | 120 | *>24 |
| 20 | 15.0 | 15.0 | 0.5 | Uranyl nitrate hexahydrate | 0.0015 | 160 | 90 | 45 |
| 21 | 15.0 | 15.0 | 0.5 | ---do--- | 0.03 | 120 | 90 | 8 |
| 22 | 15.0 | 15.0 | 0.5 | ---do--- | 0.03 | 160 | 90 | 5 |
| 23 | 15.0 | 15.0 | 0.5 | ---do--- | 0.003 | 160 | 90 | 25 |
| 24 | 17.5 | 17.5 | 0.5 | ---do--- | 0.05 | 100 | 25 | [5] 7 |
| 25 | 17.5 | 17.5 | 0.5 | Uranyl butyrate | 0.044 | 100 | 25 | [5] 3 |
| 26 | 17.5 | 17.5 | 0.5 | Uranium tetraoctoate | 0.08 | 100 | 25 | [5] 12 |
| 27 | 17.5 | 17.5 | 0.5 | Uranyl o-benzoylbenzoate | 0.076 | 100 | 25 | [5] 12 |
| 28 | 17.5 | 17.5 | 0.5 | Ammonium diuranate | 0.07 | 100 | 90 | [5] 28 |
| 29 | 15.0 | 15.0 | 0.5 | None | | 160 | 120 | *3½ |

[1] 3,4-epoxy-6-methylcyclohexylmethyl 3,4-epoxy-6-methylcyclohexanecarboxylate.
[2] Empol 1022, see Example 12.
[3] When placed in oven.
[4] Measured from time formulation placed in oven except when noted otherwise.
[5] Measured from time formulation reached 100° C.
* Hours.

Example 30

Table III below, demonstrates the physical properties of uranyl nitrate catalyzed copolymers of epoxides with carboxylic acids. For the experiments employing a catalyst concentration of 0.05 weight percent, the compositions were initially cured for 2 hours at 120° C. For the experiments employing 0.01 weight percent catalyst, curing was effected for 2 hours at 120° C., and an additional 2 hours at 160° C. The aging times indicated in the table are thus measured after completion of the initial cure. It is clearly evident from the data obtained that relatively low concentrations of catalyst provide a resin with outstanding physical properties.

Barcol hardness values were determined after 1 hour at 120° C. and an additional hour at 180° C.

TABLE III.—PHYSICAL PROPERTIES OF URANYL NITRATE CATALYZED COPOLYMERS OF EPOXIDES WITH CARBOXYLIC ACIDS [1]

| Property [2] | Aging Time, hrs. at 160° | Formulation, Carboxyl-Epoxide Equivalents Ratio | | | | | |
|---|---|---|---|---|---|---|---|
| | | 0.3 | | 0.4 | | 0.5 | |
| | | 0.05% Cat. | 0.01% Cat. | 0.05% Cat. | 0.01% Cat. | 0.05% Cat. | 0.01% Cat. |
| Tensile Strength in pounds per square inch. | 0 | 5,976 | 2,950 | 3,102 | 1,773 | 3,094 | 892 |
| | 2 | 6,561 | 4,686 | 4,807 | 1,536 | 2,806 | 434 |
| | 24 | 7,322 | 7,448 | 6,379 | 5,666 | 5,770 | 3,451 |
| Percent elongation | 0 | 9 | 123 | 92 | 298 | 330 | 184 |
| | 2 | 8.5 | 7.2 | 49 | 122 | 182 | 188 |
| | 24 | 11.3 | 7.4 | 11.5 | 7.2 | 7.4 | 7.8 |
| Hardness, Durometer D | 0 | 81 | 79 | 78 | 65 | 66 | 44 |
| | 2 | 84 | 81 | 81 | 77 | 76 | 59 |
| | 24 | 84 | 85 | 83 | 81 | 81 | 78 |

[1] 3,4-epoxy-6-methylcyclohexylmethyl 3,4-epoxy-6-methylcyclohexanecarboxylate copolymerized with the fatty acids of Example 12.
[2] Tensile strength and percentage total elongation were determined at 23° in accord with ASTM method D638–58T at a speed of 0.2 in. per min. The hardness was determined on a Shore Durometer (type D) 10 seconds after penetration at 23° (ASTM method D1484–57T).

*Example 31*

To a 500 milliliter round bottomed flask equipped with a stirrer, thermometer, reflux condenser and nitrogen inlet were added 101.5 grams of 3,4-epoxy-6-methylcyclohexylmethyl 3,4 - epoxy - 6 - methylcyclohexanecarboxylate, 98.5 grams of dehydrated castor oil acid, and 0.2 gram of uranyl nitrate hexahydrate. The mixture was heated to 160° C. and maintained at that temperature for 2 hours, and an additional hour at 175° C. Thereafter, 180 milliliters of xylene were added, and the mixture cooled to 25° C. The varnish solution, which contained 50 weight percent solids, had a viscosity of 800 centipoises at 22° C.

A steel panel was dipped in the varnish solution, dried at 25° C. for 30 minutes and then baked at 170° C. for an additional 30 minutes. The film was clear and tough and had excellent adhesion.

*Examples 32–34*

Table IV below, demonstrates the physical properties of uranyl butyrate catalyzed systems containing 3,4-epoxy-6 - methylcyclohexylmethyl 3,4-epoxy-6-methylcyclohexanecarboxylate and tall oil acid. The materials were mixed in the proportions indicated in the table and then poured into a circular mold in an oven at 120° C. The

*Example 35*

A solution was prepared by dissolving 0.35 gram (1 weight percent) of uranyl nitrate hexahydrate in 12.9 grams of methyl Nadic anhydride with warming. After cooling at room temperature, 22.1 grams of 3,4-epoxy-6-methylcyclohexylmethyl 3,4-epoxy-6-methylcyclohexanecarboxylate was added. The mixture gelled in 2 minutes, with a peak exotherm of 120° C. in 5 minutes.

*Example 36*

A solution was prepared by dissolving 0.0035 gram (0.01 weight percent) of uranyl nitrate hexahydrate in 12.9 grams of methyl Nadic anhydride. Thereafter 22.1 grams of 3,4-epoxy-6-methylcyclohexylmethyl 3,4-epoxy-6-methylcyclohexanecarboxylate were added and the mixture heated to 100° C. and placed in an oven at 160° C. Gelation occured in 4 minutes with a peak exotherm of 188° C. in 9 minutes.

*Examples 37–52*

In the following examples the uranium catalyst was first dissolved in the anhydride in the proportions indicated in Table V. Thereafter, the 3,4-epoxy-6-methylcyclohexylmethyl 3,4 - epoxy-6-methylcyclohexanecarboxylate was added and the mixture heated, or allowed to exotherm to the indicated temperatures. As demonstrated below, the catalytic activity of the uranium compounds is significantly greater than for the non-uranium catalysts:

TABLE IV.—PHYSICAL PROPERTIES OF URANYL BUTYRATE CATALYZED SYSTEMS OF EPOXIDES AND CARBOXYLIC ACIDS

| Example | Grams of Epoxide [1] | Grams of Acid [2] | Grams of Catalyst | Carboxyl-Epoxide Ratio | Gel time [3] | Hardness Barcol No. 936 | Description of Resin |
|---|---|---|---|---|---|---|---|
| 32 | 25.1 | 4.9 | 0.030 | 0.1 | 4 | 82 | Tough. |
| 33 | 21.6 | 8.4 | 0.030 | 0.2 | 2 | 72 | Very tough. |
| 34 | 19.0 | 11.0 | 0.030 | 0.3 | 4 | 52 | Do. |

[1] 3,4-epoxy-6-methylcyclohexylmethyl 3,4-epoxy-6-methylcyclohexanecarboxylate.
[2] Tall oil acid.
[3] In minutes at 120° C.

TABLE V.—CATALYTIC ACTIVITY FOR COPOLYMERIZATION OF EPOXIDES WITH CARBOXYLIC ACID ANHYDRIDES

| Example | Grams of Epoxide [1] | Anhydride | Grams | Carboxyl/Epoxide Ratio | Catalyst | Grams | Oven Temp., °C. | Gel Time,[2] min. |
|---|---|---|---|---|---|---|---|---|
| 37 | 22.1 | Methyl Nadic Anhydride. | 12.9 | 1.0 | Uranyl nitrate hexahydrate. | 0.35 | 25 | 2. |
| 38 | 22.1 | ----do---- | 12.9 | 1.0 | ----do---- | 0.0035 | 160 | 4. |
| 39 | 23.2 | Hexahydrophthalic Anhy. | 11.7 | 1.0 | ----do---- | 0.5 | 25 | Immediate. |
| 40 | 23.3 | ----do---- | 11.7 | 1.0 | Uranium tetraoctoate. | 0.8 | 100 | ([2],[3]). |
| 41 | 23.3 | ----do---- | 11.7 | 1.0 | Uranyl o-benzoylbenzoate. | 0.75 | 100 | ([2],[3]). |
| 42 | 23.3 | ----do---- | 11.7 | 1.0 | Stannous octoate. | 0.4 | 100 | 14. |
| 43 | 22.1 | ([4]) | 12.9 | 1.0 | Uranyl butyrate. | 0.088 | 100 | 1. |
| 44 | 22.1 | ([4]) | 12.9 | 1.0 | ----do---- | 0.11 | 100 | 3. |
| 45 | 22.1 | ([4]) | 12.9 | 1.0 | Uranyl nitrate hexahydrate. | 0.1 | 100 | 1. |
| 46 | 22.1 | ([4]) | 12.9 | 1.0 | Uranyl o-benzoylbenzoate. | 0.15 | 100 | 3. |
| 47 | 22.1 | ([4]) | 12.9 | 1.0 | Uranium tetraoctoate. | 0.16 | 100 | 3. |
| 48 | 22.1 | ([4]) | 12.9 | 1.0 | Uranyl ethylenediaminebisacetylacetonate. | 0.1 | 100 | 4. |
| 49 | 22.1 | ([4]) | 12.9 | 1.0 | Uranyl butyrate. | 0.088 | 60 | 2. |
| 50 | 22.1 | ([4]) | 12.9 | 1.0 | Uranyl nitrate hexahydrate. | 0.10 | 60 | 2. |
| 51 | 22.1 | ([4]) | 12.9 | 1.0 | Uranyl o-benzoylbenzoate. | 0.15 | 60 | 11. |
| 52 | 22.1 | ([4]) | 12.9 | 1.0 | Stannous octoate. | 0.4 | 60 | >2 h |

[1] 3,4-epoxy-6-methylcyclohexylmethyl 3,4-epoxy-6-methylcyclohexanecarboxylate.
[2] Measured from time formulation reached oven temperature.
[3] Gelled before oven temperature was reached.
[4] A mixture of 3 and 4-methyl-1,2,3,6-tetrahydrophthalic anhydrides.

Example 53

A solution was prepared by dissolving 0.18 gram (0.5 weight percent) of uranyl nitrate hexahydrate in 13.3 grams of a propylene oxide adduct of 1,2,6-hexanetriol (molecular weight 700). Thereafter 21.7 grams of 3,4-epoxy-6-methylcyclohexylmethyl 3,4-epoxy-6-methylcyclohexanecarboxylate were added and the mixture heated to 120° C., and then placed in an oven at 160° C. Gelation occurred in 25 minutes and a tough, flexible resin was obtained after 2 hours at 160° C.

Example 54

Uranyl butyrate, 0.07 gram (0.2 weight percent), was dissolved in 1.8 grams of 1,1,1-trimethylolpropane. To this solution was added 15.9 grams of dicyclopentadiene dioxide and 17.3 grams of methyl Nadic anhydride. The mixture was heated to 120° C. and then placed in an oven at 150° C. Gelation occurred in 30 minutes with a peak exotherm of 171° C. in 5 minutes.

Example 55

A solution was prepared by dissolving 0.14 gram (0.2 weight percent) of uranyl nitrate hexahydrate in 3.4 grams of 1,1,1-trimethylolpropane. To this solution was added 31.9 grams of dicyclopentadiene dioxide and 34.7 grams of methyl Nadic anhydride. The mixture was heated to 120° C. and then placed in two ½″ x ½″ x 6″ molds in a 140° C. oven. The temperature was maintained at 140° C. for 2 hours, then raised to 160° C. for 6 hours at which time the resin bars were removed from the mold. The heat distortion temperature of the bars at this stage of cure was 159° C. After 6 hours post cure at 260° C. it was 218° C., and after 24 hours additional post cure at 260° C., it had risen to 291° C. The heat distortion temperature was determined by ASTM method D-648-56 using a fiber stress of 264 pounds per square inch.

Example 56

Uranyl nitrate hexahydrate, 0.1 gram (0.28 weight percent), was dissolved in 6.1 grams of a propylene oxide adduct of 1,2,6-hexanetriol (molecular weight 700). To this solution were added 19.8 grams of 3,4-epoxy-6-methylcyclohexylmethyl 3,4-epoxy-6-methyl-cyclohexanecarboxylate and 9.1 grams of methyl Nadic anhydride. Gelation occurred at 80° C. in 3 minutes.

Example 57

The utility of uranium catalysts with polyepoxides was demonstrated in the preparation of epoxide foams by the following procedure.

To 200 grams of 3,4-epoxy-6-methylcyclohexylmethyl 3,4-epoxy-6-methylcyclohexanecarboxylate was added 83 grams of the reaction product of maleic anhydride and the propylene oxide adduct of glycerol (25 percent excess maleic anhydride), 23 grams of toluenediisocyanate (20 percent 2,6- and 80 percent 2,4-isomers), 56 grams of Ucon 11 (trichlorofluoromethane), 3.7 grams of a silicone oil surfactant (siloxane-oxyalkylene copolymer), and 3.7 grams (1 weight percent) uranyl butyrate. All of the ingredients were mixed at room temperature and a 3.0 lbs. per cubic foot foam was obtained.

Example 58

The utility of uranium catalysts with polyepoxides was further demonstrated in the preparation of an epoxide foam having a density of 2.3 lbs. per cubic foot. A mixture was prepared containing 200 grams of 3,4-epoxy-6-methylcyclohexylmethyl 3,4-epoxy-6-methylcyclohexanecarboxylate, 83 grams of the reaction product of maleic anhydride and the propylene oxide adduct of glycerol (25 percent excess maleic anhydride), 23 grams of toluenediisocyanate (20 percent 2,6- and 80 percent 2,4-isomers), 47 grams of Ucon 11 (trichlorofluoromethane), 3.7 grams of a silicone oil surfactant (siloxane-oxyalkylene copolymer), and 4.5 grams (1.2 weight percent) of uranyl nitrate hexahydrate. All of the ingredients were mixed at room temperature and a 2.3 lbs. per cubic foot foam was obtained.

Example 59

1.0 gram of uranyl chloride was dissolved in 34.5 grams of the reaction product of maleic anhydride and the propylene oxide adduct of 1,2,6-hexanetriol at 100° C. To this mixture after cooling to room temperature was then added a solution containing 50 grams of 3,4-epoxy-6-methylcyclohexylmethyl 3,4-epoxy-6-methylcyclohexanecarboxylate, 5.7 grams of toluenediisocyanate (20 percent 2,6- and 80 percent 2,4-isomers), 9.7 grams of Ucon 11 (trichlorofluoromethane), and 1.0 gram of a silicone oil surfactant. After the mixture had foamed it was placed in a 70° C. oven for 10 minutes. A foam having a fine cell size was obtained.

The aforesaid procedure was repeated using 1.0 gram of uranyl acetate in place of the uranyl chloride. A foam having a fine cell size was also obtained.

Example 60

1.08 grams of uranyl p-toluyl o-benzoate were dissolved in 34.5 grams of the reaction product of maleic anhydride and the propylene oxide adduct of 1,2,6-hexanetriol at 100° C. To this mixture after cooling to room temperature was then added a solution containing 50 grams of 3,4-epoxy-6-methylcyclohexylmethyl 3,4-epoxy-6-methylcyclohexanecarboxylate, 5.7 grams of toluenediisocyanate (20 percent 2,6- and 80 percent 2,4-isomers), 9.7 grams of Ucon 11 (trichlorofluoromethane), and 1.0 gram of a silicone oil surfactant. The mixture was then poured into an aluminum foil mold and allowed to foam. A foam having a fine cell size was obtained.

Although the invention has been illustrated by the preceding examples, it is not to be construed as limited to the materials employed therein, but rather, the invention encompasses the generic area as hereinbefore disclosed. Various modifications and embodiments of this invention can be made without departing from the spirit and scope thereof.

What is claimed is:

1. A curable composition comprising an epoxide compound containing at least one vicinal epoxy group and a catalytic amount of a uranium compound selected from the group consisting of uranyl ethylenediamine bisacteylacetonate, uranyl bisbenzoylacetonate pyridine, uranyl bisacetylacetonate pyridine, uranyl bisacetylacetonate quinoline: $UX_{4/z}Yn$, $UOX_{2/z}Yn$, $UO_2X_{2/z}Yn$, $M_{2/z}UO_4$, $M_{2/z}U_2O_7$ and uranium oxides, wherein X represents a member selected from the group consisting of acylate groups, monovalent and divalent inorganic acid anions; z represents the valence of X in the formulae containing X, and the valence of M in the formulae containing M; Y represents an uncharged ligand selected from the group consisting of water, amines, carboxyl compounds; M represents a member selected from the group consisting of ammonium and alkali metal cations; and $n$ has a value from 0 to 9.

2. A curable composition comprising an epoxide compound containing at least one vicinal epoxy group and a catalytic amount of a uranium acylate.

3. A curable composition comprising an epoxide compound containing at least one vicinal epoxy group and a catalytic amount of a uranyl acylate.

4. A curable composition comprising an epoxide compound containing at least one vicinal epoxy group and a catalytic amount of a uranium salt of an inorganic acid.

5. A curable composition comprising an epoxide compound containing at least one vicinal epoxy group and a catalytic amount of an alkali metal uranate.

6. A curable composition comprising an epoxide compound containing at least one vicinal epoxy group and a catalytic amount of an alkali metal polyuranate.

7. A curable composition comprising an epoxide compound containing at least one vicinal epoxy group and a catalytic amount of a uranium oxide.

8. A curable composition comprising an epoxy compound containing at least one vicinal epoxy group and a catalytic amount of uranium tetraoctoate.

9. A curable composition comprising an epoxy compound containing at least one vicinal epoxy group and a catalytic amount of uranyl butyrate.

10. A curable composition comprising an epoxy compound containing at least one vicinal epoxy group and a catalytic amount of uranyl octoate.

11. A curable composition comprising an epoxy compound containing at least one vicinal epoxy group and a catalytic amount of uranyl o-benzoylbenzoate.

12. A curable composition comprising an epoxy compound containing at least one vicinal epoxy group and a catalytic amount of uranyl p-toluyl-o-benzoate.

13. A curable composition comprising an epoxy compound containing at least one vicinal epoxy group and a catalytic amount of uranyl ethylenediamine bisacetylacetonate.

14. A curable composition comprising an epoxy compound containing at least one vicinal epoxy group and a catalytic amount of uranyl nitrate.

15. A curable composition comprising an epoxy compound containing at least one vicinal epoxy group and a catalytic amount of ammonium diuranate.

16. A curable composition comprising an epoxide compound containing at least one vicinal epoxy group, an active organic hardener selected from the group consisting of monocarboxylic acids, polycarboxylic acids, polycarboxylic acid anhydrides, polyols, polythiols, polyisocyanates and polyacyl halides, and a catalytic amount of a uranium compound selected from the group consisting of uranyl ethylenediamine bisacetylacetonate, uranyl bisbenzoylacetonate pyridine, uranyl bisacteylacetonate pyridine, uranyl bisacetylacetonate quinoline: $UX_{4/z}Yn$, $UOX_{2/z}Yn$, $UO_2X_{2/z}Yn$, $M_{2/z}UO_4$, $M_{2/z}U_2O_7$ and uranium oxides, wherein X represents a member selected from the group consisting of acylate groups, monovalent and divalent inorganic acid anions; z represents the valence of X in the formulae containing X, and the valence of M in the formulae containing M; Y represents an uncharged ligand selected from the group consisting of water, amines, carboxyl compounds; M represents a member selected from the group consisting of ammonium and alkali metal cations; and $n$ has a value of from 0 to 9.

17. The composition of claim 16 wherein the organic hardener is a polycarboxylic acid.

18. The composition of claim 16 wherein the organic hardener is a polycarboxylic acid anhydride.

19. The composition of claim 16 wherein the organic hardener is a polyol.

References Cited

UNITED STATES PATENTS 3,117,099    1/1964    Proops et al. _____ 260—47

OTHER REFERENCES

Pearson: Nuclear Sci. Abst., vol. 12, No. 2, Jan. 31, 1958, Abstract 1280 (p. 144).
Grosse (I): Chem. Abstracts, vol. 53 (1959) 16629i.
Grosse (II): Chem. Abstracts, vol. 53 (1959) 16781e.
Eastman et al.: Chem. Abstract, vol. 53 (1959) 16667b.

WILLIAM H. SHORT, *Primary Examiner.*

H. BUESTEIN, T. D. KERWIN, A. LIBERMAN,
*Assistant Examiners.*